Feb. 7, 1939.　　　　H. W. CRAM　　　　2,145,849
SCREW THREAD GAUGE
Filed Dec. 10, 1937
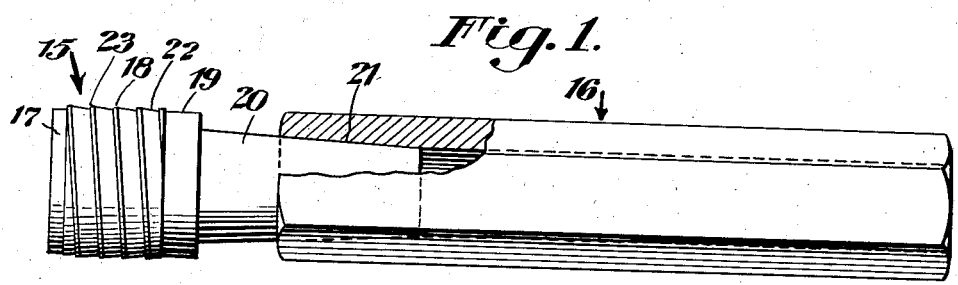
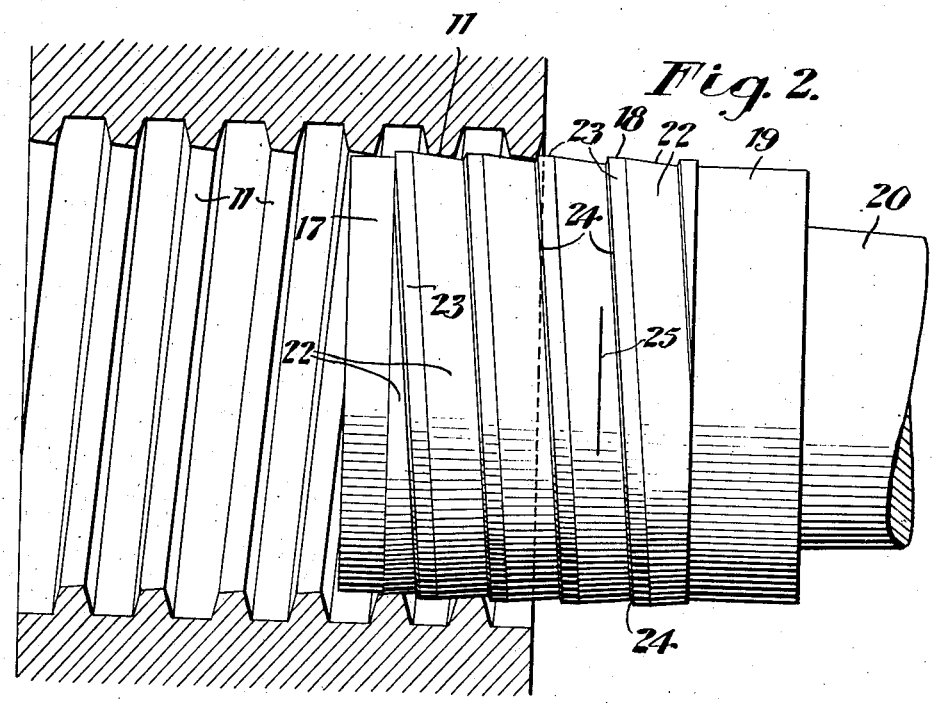
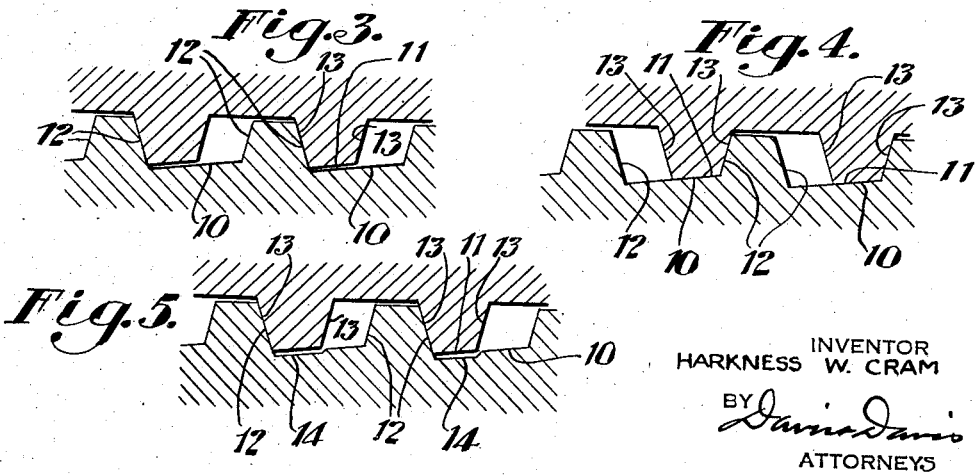
INVENTOR
HARKNESS W. CRAM
BY
ATTORNEYS Patented Feb. 7, 1939

2,145,849

UNITED STATES PATENT OFFICE 2,145,849

SCREW THREAD GAUGE

Harkness W. Cram, Mount Vernon, N. Y., assignor to Dardelet Threadlock Corporation, New York, N. Y., a corporation of Delaware Application December 10, 1937, Serial No. 179,047

13 Claims. (Cl. 33—199)

This invention relates to improvements in gauges of the type having a gauging screw thread for screw engagement with a thread to be gauged. More particularly the invention relates to improvements in such a gauge designed for gauging threads of the Dardelet self-locking type, disclosed in U. S. Patent No. 1,657,244.

Important objects of the invention are to provide a satisfactory gauge of said type designed for manufacture at a comparatively low cost; to provide an improved gauge for diameter gauging of the locking surfaces of threads of the Dardelet type; and to provide such a gauge of the plug type designed so that a single threaded gauge end will serve as both a "go" and "no go" gauge for diameter gauging of the locking surface of an internal thread of the Dardelet type.

Other objects of the invention will appear hereinafter.

In the drawing,

Figure 1 is a side view of the improved gauge device partly in section;

Fig. 2 is an enlarged side view of the gauge end of the device showing it screw-engaged with a Dardelet thread in a nut, shown in section;

Fig. 3 is an enlarged sectional view of a portion of a screw coupling of the Dardelet type, the threads being shown in their unlocked relation;

Fig. 4 is a view similar to Fig. 3 showing the threads in their locked relation; and Fig. 5 is a view similar to Fig. 3 of a modified form of such a coupling.

In order that the gauge and its use and advantages in gauging Dardelet threads may be readily understood a brief description of a Dardelet screw coupling follows:

As shown in Figs. 3 and 4 a standard commercial form of Dardelet external screw thread, such as that of a bolt, has a locking surface 10 which in cross section extends the full width of the bottom of the thread groove. This surface slopes slightly with reference to the thread axis, the rise of the slope being in the direction of the tip of the bolt, that is away from the bolt head. An internal thread, such as that of a nut, complementary to said external thread, has along its crest a locking surface 11 with a slope similar to that of the root surface 10. The degree of slope is within the angle of friction, or the angle of depose, of the two locking surfaces. In standard Dardelet threads the slope is six degrees. The groove of each thread is materially wider than its rib to afford substantial clearance for crosswise axial displacement of one thread on the other.

When the nut is screwed home and its axial advance is arrested by contact with an abutment, further rotation of the nut displaces its thread to force its locking surface 11 into frictional locking engagement with the sloping locking surface 10 of the bolt thread, as shown in Fig. 4. The rib of the bolt thread has side faces 12 abrupt with reference to the thread axis, and the rib of the nut thread has similarly abrupt side faces 13 to abut the faces 12 and positively limit thread displacement in both directions. It is necessary that the locking surfaces 10 and 11 be very accurately gauged for proper coaction. When the threads are in their unlocked relation there should be clearance between said surfaces for free screwing. At the same time said clearance must be quite limited in order to obtain adequate locking effect when one thread is shifted across the other for locking. In Fig. 5 there is shown a modified form of the Dardelet screw coupling. Here the groove bottom of the external or bolt thread has a tolerance-augmenting channel 14 affording clearance for the locking crest surface 11 and increasing the diameter tolerance range for said surface. This form of coupling is disclosed in U. S. Patent No. 2,091,788 to Edward J. McManus.

The present invention is directed primarily to the provision of a satisfactory and inexpensive gauge for diameter gauging of the sloping locking surface 11 of the internal thread. In the interests of accuracy and economy it is most desirable that a thread gauge have no relatively movable parts. Heretofore it has been customary to employ for Dardelet internal thread gauging a gauge in which all parts are rigidly connected but said gauge has two threaded plug ends which are expensive to make. One end is a "go" gauge for testing the thread to determine if its minor diameter is not less than the permissible minimum limit. The opposite end is a "no go" gauge for testing the thread to determine if its minor diameter is not greater than the permissible maximum limit. The present invention provides a gauge having a single threaded plug end designed for very inexpensive manufacture and designed also to serve as both a "go" and a "no go" gauge for an internal thread made for either the coupling shown in Figs. 3 and 4 or for the coupling shown in Fig. 5.

The gauge comprises a plug gauge end section 15 made of a single piece of metal, and a handle section 16 rigidly joined at one end to the gauge section and also made of a single piece of metal. At its outer end the gauge piece is formed with a blank, smooth, cylindrical pilot portion 17. This pilot portion is of a diameter equal to the minimum permissible minor diameter of the sloping crest surface 11 of a thread intended for a coupling like that shown in Fig. 5. Immediately following the pilot portion the gauge piece is formed with an external gauging screw thread 18 coaxial with the pilot portion. Directly back of the said thread the gauge piece is formed with a blank, smooth, cylindrical follower portion 19 of approximately the same diameter as the pilot portion 17. A tapered shank or tang 20 integrally formed with the gauge piece extends longitudinally from the follower portion and has a binding fit in the flared portion 21 of an axial bore in the handle. The handle may have a polygonal cross section, as indicated.

The gauging thread 18 is profiled to provide it with a helicoidal gauging surface 22. This surface is smooth and continuous along the thread and it slopes crosswise six degrees with reference to the gauge axis, corresponding to the slope of the surface 11 of the thread to be gauged. The direction of slope is inward away from the outer end of the gauge. That is, the high side of the sloping surface is nearest the pilot portion 17. The width of the gauging surface is preferably several times that of the surface 11 to be gauged. The minor diameter of the sloping surface 22 is equal to the minimum permissible minor diameter of the surface 11 of a thread intended for the coupling shown in Fig. 5. Said minor diameter of surface 22 is therefore equal to that of the pilot portion 17. The maximum diameter limit of the thread surface 11 is the same for both forms of couplings shown in Figs. 3, 4 and 5, and the major diameter of the sloping gauging surface 22 exceeds the maximum limit of the major diameter of thread surface 11. Along the high side of the sloping gauge surface 22 the gauge thread has a narrow helicoidal crest surface 23 whose diameter is uniform and equal to the major diameter of surface 22. An abrupt helicoidal side face 24 of the gauge thread connects the surface 23 with the low side of the surface 22. Said face 24 is inclined fourteen and one-half degrees to a line normal to the gauge axis, thereby corresponding to the inclination of the side faces of the thread to be gauged.

An important feature of the gauge thread is that its pitch or lead differs from the lead of the thread to be gauged by a fraction of the latter lead. In the present instance the lead of the gauge thread is less than that of the thread to be gauged. For example, for gauging an internal thread which is to mate with a three-quarter-inch external thread having a lead of one-eighth of an inch, the gauge thread may be provided with a lead of one-ninth of an inch. In the present instance the gauge thread has four and a fraction convolutions. The number of convolutions and the profile and dimensions of the gauge thread and the said pitch differential are correlated with the thread to be gauged for performing the gauging operations described hereinafter.

Assume that an internal thread for the coupling shown in Fig. 5 is to be gauged. If said thread will not receive the pilot portion 17 of the gauge it is indication that the diameter of surface 11 of said thread is less than the minimum permissible limit, since the diameter of the pilot portion conforms to said limit. If the internal thread admits the pilot an effort is made to screw it along the gauge thread and if it refuses to screw at all upon the gauge thread it is indication that the diameter of its surface 11 is still too small. This screwing test is made as a check-up, as admission of the pilot may be due to the fact that the higher crest corner of the internal thread is slightly blunt due to imperfect cutting of the thread. If the internal thread will screw upon the gauge thread its leading end portion will travel along the abrupt side face 24 of the gauge thread which forms a guiding abutment for said leading end portion. Due to the said pitch or lead differential the following length of the internal thread will have its rib spaced progressively farther from said face 24. This progressive displacement brings the sloping surface 11 progressively nearer to the gauging surface 22 and if it effects a binding engagement with surface 22 at any point along the latter and thereby inhibits further screwing it is indication that the diameter of surface 11 is within both the maximum and minimum limits of permissible variation, or within the tolerance range, and the gauged thread is acceptable. If, however, the thread being gauged or tested fails to bind at any point along the gauge thread and can be screwed entirely off the gauge thread it is indication that the diameter of surface 11 exceeds the maximum permissible limit, and the thread is unacceptable. The follower portion 19 of the gauge guides the nut thread as it passes beyond the gauge thread and prevents canting of the nut and cramping of said threads.

The gauge is employed as follows to gauge an internal thread for the form of coupling shown in Figs. 3 and 4. In that coupling, because of the fact that there is no tolerance-augmenting channel in the groove bottom of the bolt thread, the surface 11 of the nut thread requires a slightly larger minimum diameter gauging than in the case just discussed. The diameter of surface 11 must be sufficient to permit the thread to screw along several convolutions of the gauge thread before surface 11 binds upon the gauging surface 22. The gauge thread is provided with a mark 25. The threaded aperture of the nut should be able to receive the pilot end of the gauge and the nut thread should be able to screw along the gauge thread until the rear face of the nut coincides with the mark 25. If surface 11 binds upon surface 22 before said mark is reached it is indication that the diameter of surface 11 is less than the permissible limit. If binding occurs when said coincidence occurs it is indication that the diameter of surface 11 is ideal. If binding occurs at any point along the gauge thread after the nut face has passed the mark 25 it is indication that the diameter of surface 11 is still within the maximum permissible limit and the nut thread is acceptable. If, however, the nut thread fails to bind at any point along the gauge thread it is indication that the diameter of surface 11 exceeds the maximum permissible limit and the nut thread is unacceptable.

It will be seen that the single plug gauge is designed to serve as both a "go" and a "no go" gauge for a thread intended for the coupling shown in Figs. 2 and 3 and also for a thread intended for the coupling shown in Fig. 5. The single gauge plug thereby takes the place of four gauge plugs with consequent great saving in gauge cost. In addition to that the employment of the single gauge plug as described materially reduces the labor of gauging.

What I claim is:

1. A gauge for diameter gauging of the sloping locking crest surface of an internal screw thread of the Dardelet self-locking type, comprising a plug having an external gauging screw thread, characterized in that said gauging thread has a helicoidal gauging surface with a crosswise slope in an axial direction corresponding to the ideal locking crest slope of the thread to be gauged and of a width materially exceeding that of said crest slope, the minor diameter of said sloping gauging surface is equal to the minimum permissible minor crest diameter of the thread to be gauged and the major diameter of the sloping gauging surface exceeds the maximum permissible major diameter of the sloping crest surface of the thread to be gauged, the gauging thread has a helicoidal abutment surface along the low side of said sloping gauging surface and disposed more abruptly with respect to the gauge axis than the gauging surface, to engage the rib of the thread to be gauged, the plug has a cylindrical pilot portion in advance of the gauging thread and of a diameter equal to said minor diameter of the sloping gauging surface, and the lead of one of said two threads being greater than the lead of the other one of said threads by a fraction of the lead of one of said threads whereby, as the gauging thread is screwed into the thread to be gauged the crest of the thread to be gauged will be progressively differentially spaced along the sloping, gauging surface of the gauging thread from the low point toward the high point thereof.

2. A screw thread gauge according to claim 1, characterized in that the lead of the gauging thread is less than that of the thread to be gauged.

3. A screw thread gauge according to claim 1, characterized in that the said plug has a cylindrical guide portion following the gauging thread for the purpose set forth.

4. A gauge for diameter gauging of the sloping locking crest surface of an internal screw thread of the Dardelet self-locking type, comprising a plug having an external gauging screw thread, characterized in that said gauging thread has a helicoidal gauging surface with a crosswise slope in an axial direction corresponding to the ideal locking crest slope of the thread to be gauged and of a width materially exceeding that of said crest slope, the minor diameter of said sloping gauging surface does not exceed the minimum permissible minor crest diameter of the thread to be gauged and the major diameter of the sloping gauging surface exceeds the maximum permissible major diameter of the sloping crest surface of the thread to be gauged, the gauging thread has a helicoidal abutment surface along the low side of said sloping gauging surface and disposed more abruptly with respect to the gauge axis than the gauging surface, to abut a rib flank of the thread to be gauged, and the lead of one of said two threads being greater than the lead of the other one of said threads by a fraction of the lead of one of said threads whereby, as the gauging thread is screwed into the thread to be gauged the crest of the thread to be gauged will be progressively differentially spaced along the sloping, gauging surface of the gauging thread from the low point toward the high point thereof.

5. A gauge for diameter gauging of the locking crest of an internal screw thread of the Dardelet self-locking type, comprising a plug having an external gauging thread, characterized in that said gauge thread has a helicoidal gauging surface sloping crosswise in an axial direction, the lead of one of said two threads being greater than the lead of the other one of said two threads by a fraction of the lead of one of said threads, and the arrangement and dimensions of said gauging surface and the degree of said pitch differential are correlated with the thread to be gauged, to impose a limit upon screwing advance of one of said threads on the other by binding engagement of said crest with said sloping gauging surface when the diameter of said crest is within the tolerance range and to permit further screwing advance when the diameter exceeds the tolerance range.

6. A screw thread gauge according to claim 5, characterized in that the lead of the gauging screw is less than the lead of the screw to be gauged.

7. A gauge for diameter gauging of the sloping locking surface of a screw thread of the Dardelet type, comprising a body having a gauging screw thread, characterized in that said gauging thread has a gauging surface therealong for gauging contact with said sloping locking surface and the lead of one of said two threads being greater than the lead of the other one of said two threads to limit screwing advance of one of said threads along the other by binding engagement of said gauging surface with said sloping locking surface.

8. A gauge for gauging the sloping locking surface of a screw thread of the Dardelet type, comprising a body adapted to be screwed into the thread to be gauged and formed with a gauging thread having a sloping gauging surface therealong with its lead less than the lead of the thread to be gauged by a fraction of the latter lead to cause the thread to be gauged to be progressively spaced from the low point of the gauging surface toward the high point of said surface until the limit of the screwing advance is reached by binding engagement between said sloping gauging surface and said sloping locking surface of the thread to be gauged.

9. A gauge for diameter gauging of an internal screw thread, comprising a body having a sloping gauging screw thread surface at an angle to the axis of the screw thread of the gauge for gauging contact with the crest of the internal thread by longitudinal relative displacement of the two threads, with the lead of the gauging thread less than the lead of the thread to be gauged, whereby, as the gauging thread is screwed into the thread to be gauged the crest of the thread to be gauged will be progressively differentially spaced along the sloping gauging surface of the gauging thread from the low point toward the high point thereof.

10. A gauge for diameter gauging of an internal screw thread, comprising a body having a sloping gauging screw thread surface at an angle to the axis of the screw thread of the gauge for gauging contact with the crest of the internal thread by longitudinal relative displacement of the two threads and materially wider than the crest of the thread to be gauged, with the lead of the gauging thread less than the lead of the thread to be gauged, whereby, as the gauging thread is screwed into the thread to be gauged the crest of the thread to be gauged will be progressively differentially spaced along the sloping gauging surface of the gauging thread from the low point toward the high point thereof.

11. A gauge for gauging the sloping locking surface of a screw thread of the Dardelet type, comprising a body formed with a gauging thread adapted to be screwed into engagement with the thread to be gauged and having a sloping gauging surface therealong, the lead of one of said two threads being greater than the lead of the other one of said threads by a fraction of the lead of one of said threads to cause the thread to be gauged to be progressively differentially spaced from the low point of the sloping gauging surface toward the high point of said surface until the limit of the screwing advance is reached by binding engagement between the said sloping gauging surface and said sloping locking surface of the thread to be gauged.

12. A gauge for diameter gauging of an internal screw thread, comprising a body having a sloping gauging screw thread surface at an angle to the axis of the gauge for gauging contact with the crest of the internal thread by longitudinal relative displacement of the two threads, the lead of one of said two threads being greater than the lead of the other one of said threads by a fraction of the lead of one of said threads, whereby, as the gauging thread is screwed into the thread to be gauged the crest of the thread to be gauged will be progressively differentially spaced along the sloping gauging surface of the gauging thread from the low point toward the high point thereof until said crest is in binding engagement with the said sloping surface.

13. A gauge for diameter gauging of an internal screw thread, comprising a body having a sloping gauging screw thread surface at an angle to the axis of the gauge for gauging contact with the crest of the internal thread by longitudinal relative displacement of the two threads, and materially wider than the crest of the thread to be gauged, with the lead of the gauging thread less than the lead of the thread to be gauged by a fraction of the lead of latter thread, whereby, as the gauging thread is screwed into the thread to be gauged the crest of the thread to be gauged will be progressively differentially spaced along the sloping gauging surface of the gauging thread from the low point toward the high point thereof until said crest is in binding engagement with the said sloping surface.

HARKNESS W. CRAM.